US009251610B2

(12) United States Patent
Bak et al.

(10) Patent No.: US 9,251,610 B2
(45) Date of Patent: Feb. 2, 2016

(54) LOCATION INFO-GRAPHICS VISUALIZATIONS

(71) Applicant: GlobalFoundries U.S. 2 LLC, Hopewell Junction, NY (US)

(72) Inventors: Peter Bak, Haifa (IL); Eli Packer, Haifa (IL); Gilad Saadoun, Haifa (IL)

(73) Assignee: GLOBALFOUNDRIES INC., Grand Cayman (KY)

( * ) Notice: Subject to any disclaimer, the term of this patent is extended or adjusted under 35 U.S.C. 154(b) by 381 days.

(21) Appl. No.: 13/904,033

(22) Filed: May 29, 2013

(65) Prior Publication Data

US 2014/0354648 A1   Dec. 4, 2014

(51) Int. Cl.
  *G06T 11/20*   (2006.01)
  *G06F 17/30*   (2006.01)

(52) U.S. Cl.
  CPC .............. *G06T 11/206* (2013.01); *G06F 17/30* (2013.01)

(58) Field of Classification Search
  None
  See application file for complete search history.

(56) References Cited

U.S. PATENT DOCUMENTS

| 6,750,864 | B1 * | 6/2004 | Anwar ........................... 345/440 |
| 7,617,042 | B2 | 11/2009 | Horvitz et al. |
| 7,813,870 | B2 | 10/2010 | Downs et al. |
| 7,948,502 | B2 * | 5/2011 | Stanton .......................... 345/629 |
| 7,983,837 | B2 | 7/2011 | Yamane et al. |
| 2002/0123976 | A1 * | 9/2002 | Baar ................................ 706/11 |
| 2008/0307369 | A1 * | 12/2008 | Liu et al. ........................ 715/855 |
| 2009/0160859 | A1 * | 6/2009 | Horowitz et al. ............. 345/440 |
| 2010/0251100 | A1 * | 9/2010 | Delacourt ...................... 715/240 |
| 2011/0261049 | A1 * | 10/2011 | Cardno et al. ................. 345/419 |
| 2012/0089920 | A1 * | 4/2012 | Eick ............................... 715/739 |
| 2013/0156318 | A1 * | 6/2013 | Beckman ....................... 382/190 |

OTHER PUBLICATIONS

Chuah M.C, "Dynamic Aggregation with Circular Visual Designs", IEEE Symposium on Information Visualization, pp. 35-43, 1998.

* cited by examiner

*Primary Examiner* — Ryan R Yang (57) ABSTRACT

A computerized visualization method for illustrating multi-dimensional data, comprising: receiving a plurality of location data points, each location data point having a plurality of measured features; choosing at least one location dimension from received said plurality of dimensions; grouping said plurality of location data points into a plurality of location groups according to chosen said at least one location dimension; plotting, by a processor, said plurality of location groups as a plurality of flower charts, each said plurality of flower charts, having a plurality of pie sectors, illustrates remaining said plurality of measured features subsequent to said choosing at least one location dimension; and positioning each said plurality of flower charts, in a visual representation, according to chosen said plurality of location dimensions.

16 Claims, 6 Drawing Sheets

LOCATION INFO-GRAPHICS VISUALIZATIONS

BACKGROUND

The present invention, in some embodiments thereof, relates to info-graphics and, more specifically, but not exclusively, to methods, computer programs and systems for multi-dimensional data visualization in the context of location.

Two dimensional data sets, also referred to as panel data, are easily analyzed, understood and visualized. However, information from a variety of disciplines, from science and engineering to business, economics and health care, often depends on a larger number of variables. Information having three of more dimensions is referred to as multi-dimensional information. The higher the dimension of the data, the more complex and challenging it become to make sense of it. Multi-dimensional information management is often achieved by visualization tools and visualization techniques. Visualization tools and techniques assist in making information based decisions, gaining insights into the information distribution, exploring interesting trends and patterns or "structure" in the information and stimulating visual thinking.

One approach to enabling multi-dimensional visualizations is reducing the data dimensions. Reducing data dimensions may introduce ambiguities in data presentation. For example, a three-dimensional scatter plot is projected onto two-dimensions. A point in the projection may correspond to any value parallel to the viewing axis. Another approach to enabling multi-dimensional visualizations is to use multiple simple representations having fewer dimensions, each representation showing a different combination of dimensions. Yet another approach to enabling multi-dimensional visualizations is to provide many visual cues such as color, patterns and size.

Figure 1:
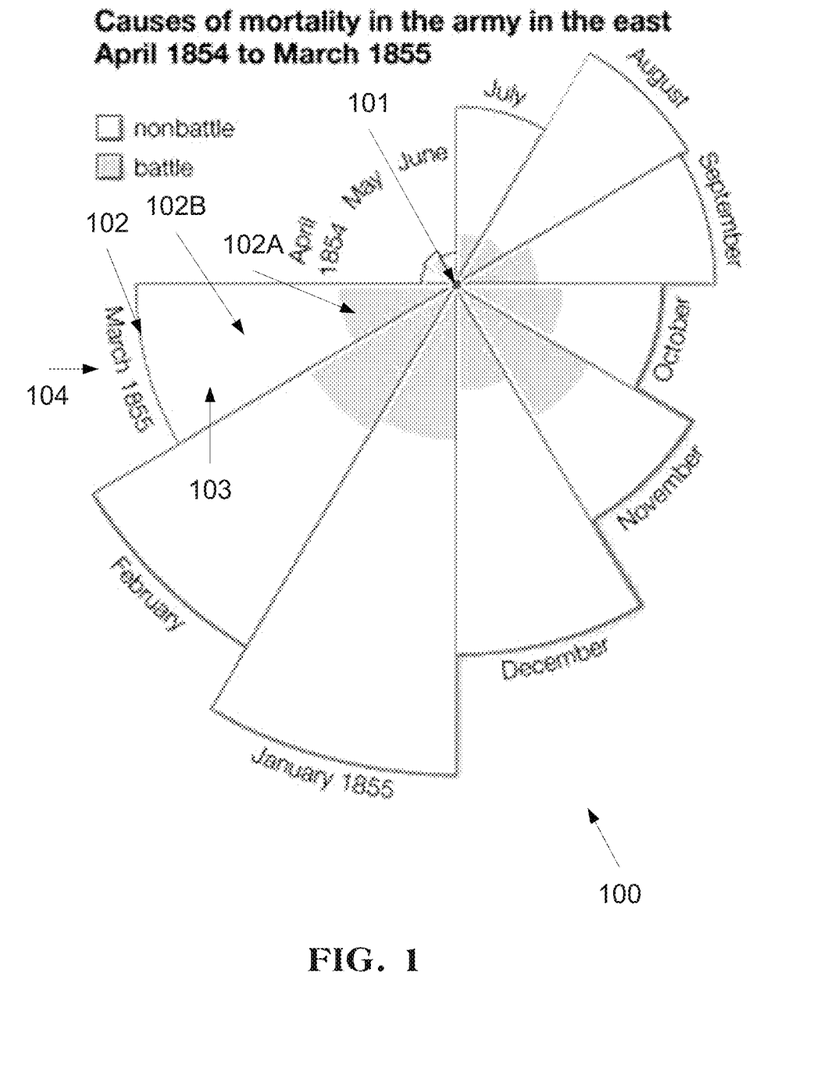
FIG. 1 is an illustration of a prior art coxcomb graph presenting aggregated statistical data of British soldiers' deaths.

Reference is now made to FIG. 1 illustrating prior art coxcomb graph 100 presenting aggregated statistical data of British soldiers' deaths. As used herein, the term/phrase coxcomb graph means a plot for illustrating multiple data dimensions, having a plurality of segments, in which the radial distance is indicative of a weight of a particular segment. In a coxcomb graph, also referred to as a polar-area graph, the segment's angel is typically not used to indicate the weight of a particular segment, as in a pie chart. This graph 100 is a classic example of a coxcomb graph as found in the work of Florence Nightingale from 1858 titled "Notes on Matters Affecting the Health, Efficiency and Hospital Administration of the British Army". Two dimensions are presented in the graph: the month of the year and the cause of death. The cause of death is classified in one of two categories: battle and non-battle. The graph is divided to 12 pie sectors 102 representing 12 months (particularly April 1854 until March 1855). Each pie sector 102 occupies an equal angel of the full circle, while the radius is changed. The filled region 102A, 102B along the radius 103 is changed in order to create an area proportional to the number of death represented in the respective category.

SUMMARY

According to an aspect of some embodiments of the present invention there is provided a computerized visualization method for illustrating multi-dimensional data, comprising: receiving a plurality of location data points, each location data point having a plurality of measured features; choosing at least one location dimension from received the plurality of measured features; grouping the plurality of location data points into a plurality of location groups according to chosen the at least one location dimension; plotting, by a processor, the plurality of location groups as a plurality of flower charts, each the plurality of flower charts, having a plurality of pie sectors, illustrates remaining the plurality of measured features subsequent to the choosing at least one location dimension; and positioning each the plurality of flower charts, in a visual representation, according to chosen the plurality of location dimensions.

Optionally, each the plurality of pie sectors has at least one segment and any two pixels of same at least one segment have an identical color value. Optionally, a plurality of segments of the plurality of pie sectors is organized according to an opacity having a series of graduated tones ranging from black to white. Optionally, a plurality of colors of a plurality of segments of the plurality of pie sectors is organized according to a color continuum scale. Optionally, the at least one segment represents at least two dimensions by at least one of: a continuous color range, a single color, an opacity, a size of an area, a visual geometric pattern and a length of a segment. Optionally, one or more of the plurality of measured features illustrated by each of the flower charts depicts raw data of the location data points. Optionally, the raw data is not aggregated and the raw data is not statistically manipulated. Optionally the method further comprises displaying the plurality of flower charts as a figure on an electronic display screen. Optionally, the method further comprises: receiving an additional plurality of location data points, each location data point having the plurality of measured features; grouping the additional plurality of location data points into the plurality of location groups according to chosen the at least one location dimension; and re-plotting, by a processor, the plurality of location groups, which comprise the additional plurality of location data point, as a plurality of flower charts, each the plurality of flower charts illustrating remaining the plurality of measured features. Optionally, the each location data point has exactly five dimensions. Optionally, the five dimensions include: a location along an X axis, a location along a Y axis, a temporal dimension and two additional dimensions. Optionally, each the plurality of flower charts is plotted as at least one of: a star with a plurality of pie sectors radiating from an origin, a ring and a radial graph. Optionally, the positioning each the plurality of flower charts is performed by placing a center of each the plurality of flower charts at a position dictated by chosen the plurality of location dimensions of a respective group of the plurality of location groups. Optionally, the visual representation is at least one of a city map, a road map, a geographic map, a building layout, a model of a retail store interior.

According to an aspect of some embodiments of the present invention there is provided a computer program product for illustrating multi-dimensional data, comprising: a computer readable storage medium; first program instructions to receive a plurality of location data points, each location data point having a plurality of measured features; second program instructions to choose at least one location dimension from received the plurality of measured features; third program instructions to group the plurality of location data points into a plurality of location groups according to chosen the at least one location dimension; fourth program instructions to plot, by a processor, the plurality of location groups as a plurality of flower charts, each the plurality of flower charts, having a plurality of pie sectors, illustrates remaining the plurality of measured features subsequent to the choosing at least one location dimension; and fifth program instructions to position each the plurality of flower charts, in a visual representation, according to chosen the plurality of location dimensions; wherein the first, second, third, fourth and fifth program instructions are stored on the computer readable storage medium.

According to an aspect of some embodiments of the present invention there is provided a system for visualizing multi-dimensional data comprising: a processor; a graphical user interface interfaced with the processor; wherein the graphical user interface: receives a plurality of location data points, each location data point having a plurality of measured features; and enables a user to choose at least one location dimension from received the plurality of measured features; and wherein the processor: groups the plurality of location data points into a plurality of location groups according to chosen the at least one location dimension; plots the plurality of location groups as a plurality of flower charts, each the plurality of flower charts, having a plurality of pie sectors, illustrates remaining the plurality of measured features subsequent to the choosing at least one location dimension; and positions each the plurality of flower charts, in a visual representation, according to chosen the plurality of location dimensions.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention.

In this regard, the description taken with the drawings makes apparent to those skilled in the art how embodiments of the invention may be practiced.

In the drawings.

DETAILED DESCRIPTION

The present invention, in some embodiments thereof, relates to info-graphics and, more specifically, but not exclusively, to methods, computer programs and systems for multi-dimensional data visualization in the context of a location.

According to some embodiments of the present invention, there are provided methods, computer programs and systems to visualize complex multi-dimensional data in a location context. The visualization is provided as flower charts presented on a map. Map embedded flower charts are created by grouping multi-dimensional data according to selected location dimensions. Each group is plotted as a flower chart showing the remaining dimensions. The graph is positioned according to the group's location information. The result presentation may reduce the number of dimensions illustrated by the flower chart, as the location data is inheritably shown by the graph's position. This type of visualization also enables a display of un-manipulated raw data despite high dimensional data complexity. Furthermore, the result presentation may enable a user to compare flower charts in their location context, to consider simultaneously a high level of data as well as raw data presented within the flower chart. Flower charts embedded in a map further provide a single visualization for both an overview and a detailed inspection of multi-dimensional data in its location context. A single pixel in a flower chart embedded in a map carries with abundant information. Despite having no dimensions other than color and location, a single pixel of such visualization holds information about the pie sector the pixel belongs to, the segment within that pie sector the pixel belongs to and the pixel opacity and/or color indicates one more dimension. The richness of data carried by a single pixel of such a flower chart makes it a good candidate for data compression, data display in low resolution and/or low reliability data transmission.

A common assumption in multi-dimensional data visualization is that a viewer prefers, especially at a beginning of a data inspection process, gaining an overview insight regarding the presented data to obtaining precise data. In other words, a visualization viewer tolerates information loss, especially in initial stages of an inquiry, in order to gain a better birds-eye view of data structure, trends and/or patterns. At the heart of such an assumption, is the classic view that numerical details are in opposition to a higher level of data summary. According to one aspect of the present invention, a visualization which includes a chart provides an overview of multi-dimensional data while keeping high granularity numerical details in their raw form. The chart of the visualization facilitates a combination of both an overall understanding of the information and a detailed examination within the same visual display. The chart of the visualization alters the knowledge discovery process from a two stage process (gaining overall understanding, then examining specific supporting details) to a unified process enabling to move back and forth seamlessly between high and low levels of information in a single visual presentation.

A common approach to enabling multi-dimensional visualizations is to provide multiple visual cues. Multiple visual cues may be, however, an overload for a user. In addition, the use of multiple encodings makes it difficult to compare trends and clusters and understand information distribution in higher dimensional spaces. Visualizing multiple dimensions while reducing the amount of provided visual cues is therefore desirable. According to one aspect of the present invention, a visualization depicts multi-dimensional data as flower charts, which are distributed according to their associated location. Such visualization enables to present multi-dimensional data containing location dimensions with minimal visual cues, making it easier to compare, examine, evaluate and/or analyze.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
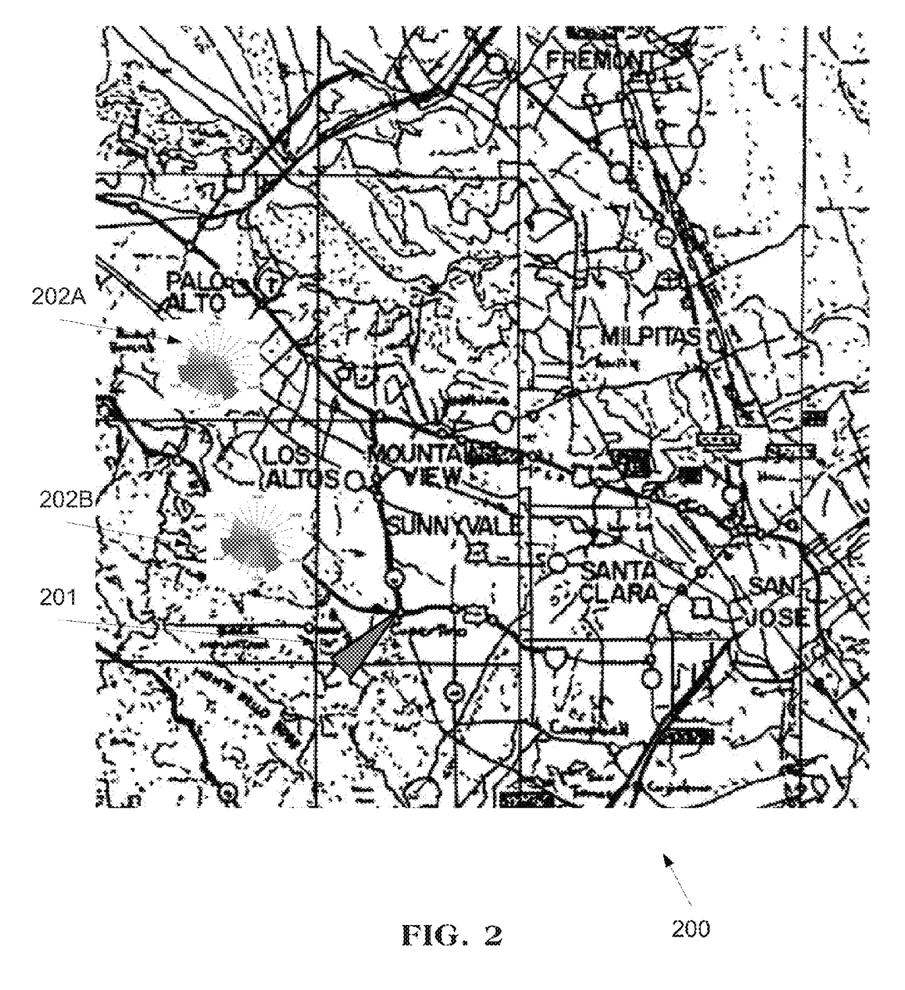
FIG. 2 is an illustration of a map with embedded flower charts, according to some aspects of the present invention.
Figure 3:
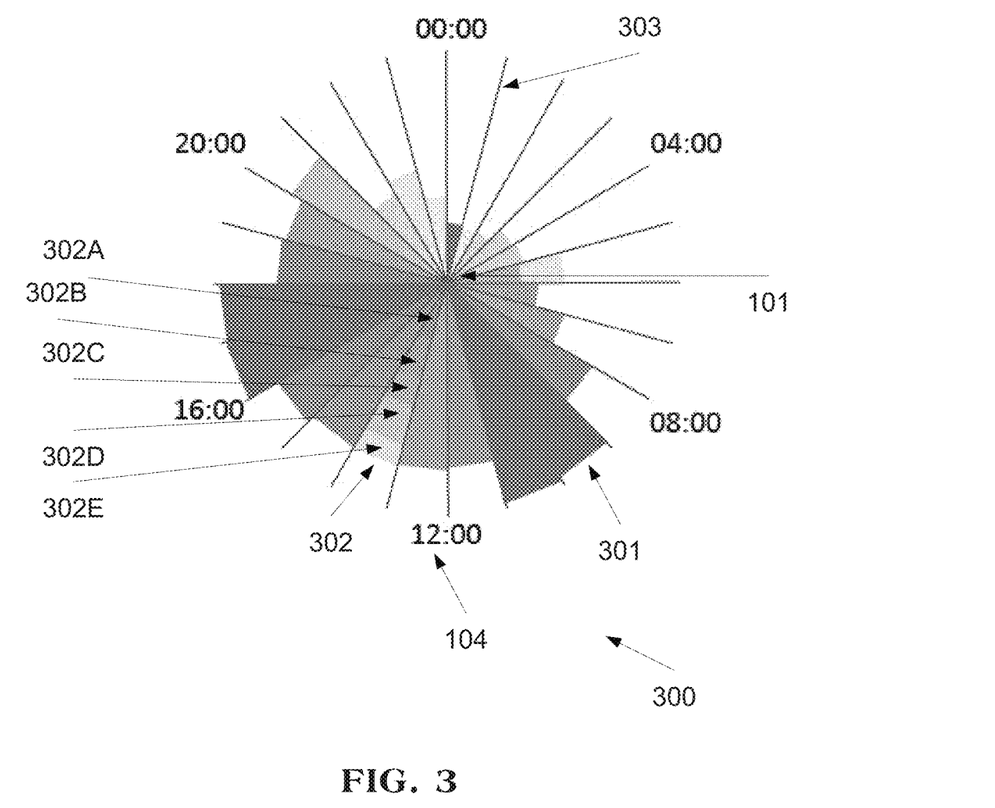
FIG. 3 is an illustration of a single flower chart of slow-down data, according to some aspects of the present invention.

Reference is now made to FIG. 2 illustrating a map 200 with embedded flower charts 201, 202A, and 202B, according to some aspects of the present invention. The map 200 shows part of the silicon-valley in California, United States. The flower charts 202A, 202B are as illustrated in FIG. 3. The center of each flower chart 201, 202A, and 202B is positioned according to the coordinates associated with the data depicted in the respective flower chart. The flower charts may present partial data if data is missing. Optionally, the map 200 depicts streets, subway routes, train routes, bus routes, other transportation means routes, natural terrain, a building layout, and/or a crowding area such as a stadium, a concert park, a fair and/or an exhibition hall. Optionally, the map is a three dimensional map and/or a cartographic map.

Reference is now made to FIG. 3 illustrating a single flower chart 300 of slow-down data, according to some aspects of the present invention. The graph 300 is divided to 24 pie sectors 302 representing the hours of a single day. Each pie sector 301, 302 have one segment 301 or multiple segments 302A-302E. The shades of a segment 302A-302E correspond to the length of the slow-down a vehicle experiences. The segments 302A-302E may be represented using an opacity. The opacity may allow using a black and white scheme. Interpreting the opacity of a segment does not require a profound study of a graph or a tendency. Rather, the opacity implemented in a flower chart 300 such as this exemplary graph test multiple words 300, indicates many if not all the dimensions of interest for data interpretation. Opacity may be used to encode continuous and/or categorical attributes. Optionally, a number of objects are overlaid using opacity. Optionally, statistical significance values such as, for example, a continuous distribution are displayed by opacity. The area of a pie sector 302 corresponds to the number of vehicles represented. The value of one measured feature is illustrated as the size of a pie sector 302. The size of the pie sector is measured from the center of the flower chart 300. The shape of the pie sector 302 may be a triangle, a sector which is the shape enclosed between an arc and the two radii at either end of that arc etc. Optionally, the value of the measured feature is illustrated proportionally to the pie sector's 302 size. Optionally, the measured feature is not spatial. Optionally, the measured feature is not temporal. In this exemplary flower chart 300, the number of vehicles for each length of a slow-down period is the measured feature illustrated by the pie sector's 302 size. The combination of the shades and the area of a segment 302A-302E together illustrated the entire slow-down volume. Here the radius 303 is depicted as same length lines from the graph's center 101. Such radii provide a reference for the area size. Optionally, the radii are not depicted. Optionally, the flower chart 300 is depicted as a star with a plurality of pie sectors 301, 302 radiating from an origin 101, a ring and/or a radial graph.

A pixel has no dimension other than color and location. Nevertheless, a single pixel of the flower chart 300 carries with it abundant information as its location implies the pie sector the pixel belongs to, the segment within that pie sector the pixel belongs to and the pixel opacity and/or color indicates one more dimension such as a slow-down period length, the number of vehicles, an amount of draws from an ATM machine etc. The richness of data carried by a single pixel of such a flower chart 300 optionally makes it a good candidate for data compression, data display in low resolution and/or low reliability data transmission.

Figure 4:
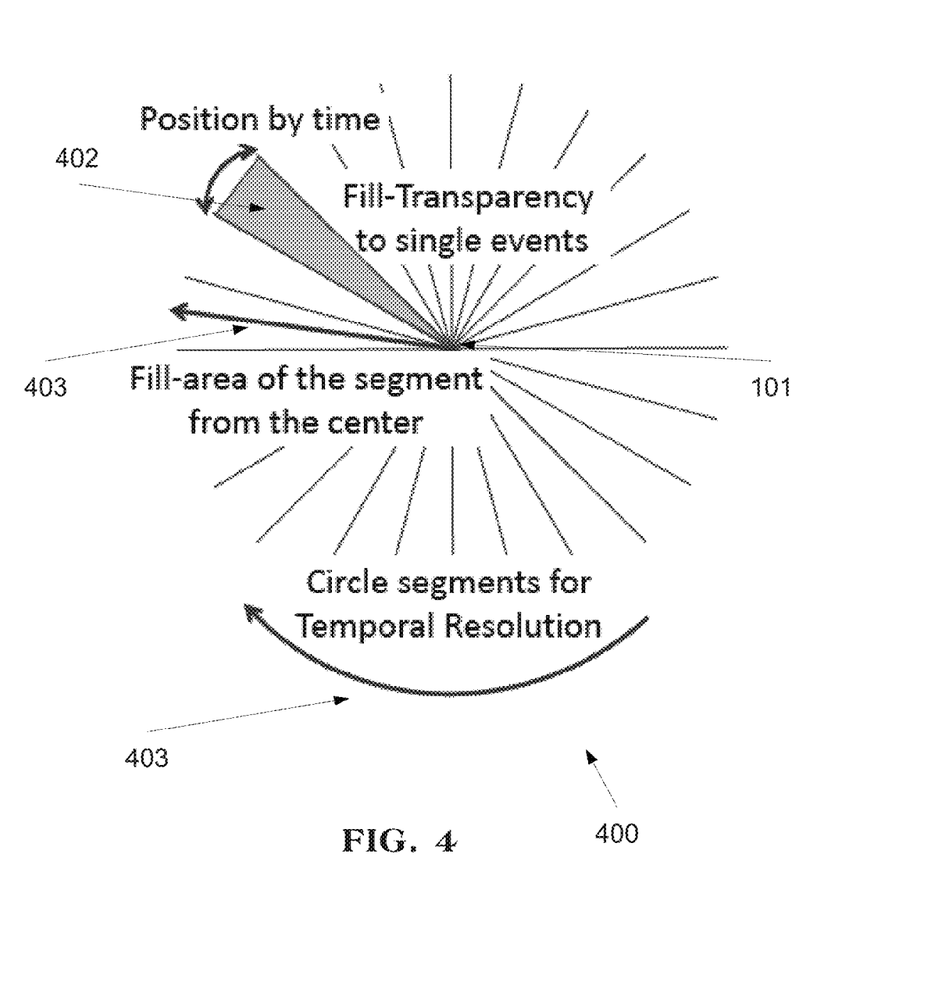
FIG. 4 is an illustration of an exemplary way of building a flower chart, according to some aspects of the present invention.

Reference is now made to FIG. 4 illustrating an exemplary way of building a flower chart 400, according to some aspects of the present invention. The presented flower chart 400 is shaped as a circle. The circle is divided to pie sectors 402. The position of each pie sector 402 in the circle is determined by temporal resolution 403: i.e. the pie sector's position is determined by the time it represents, with consecutive time being next to each other in the circle. The pie sector has one or more segments, as shown in FIG. 3. The segment's fill area is drawn from the center 101 outwards. The area is proportional to the segment's value of the dimension it represents. The transparency of the fill is determined according to single events represented in the segments. Optionally, the single events are neither summed nor statistically manipulated. Rather, the single events are coded into the transparency of the segment's fill, representing raw data.

Figure 5:
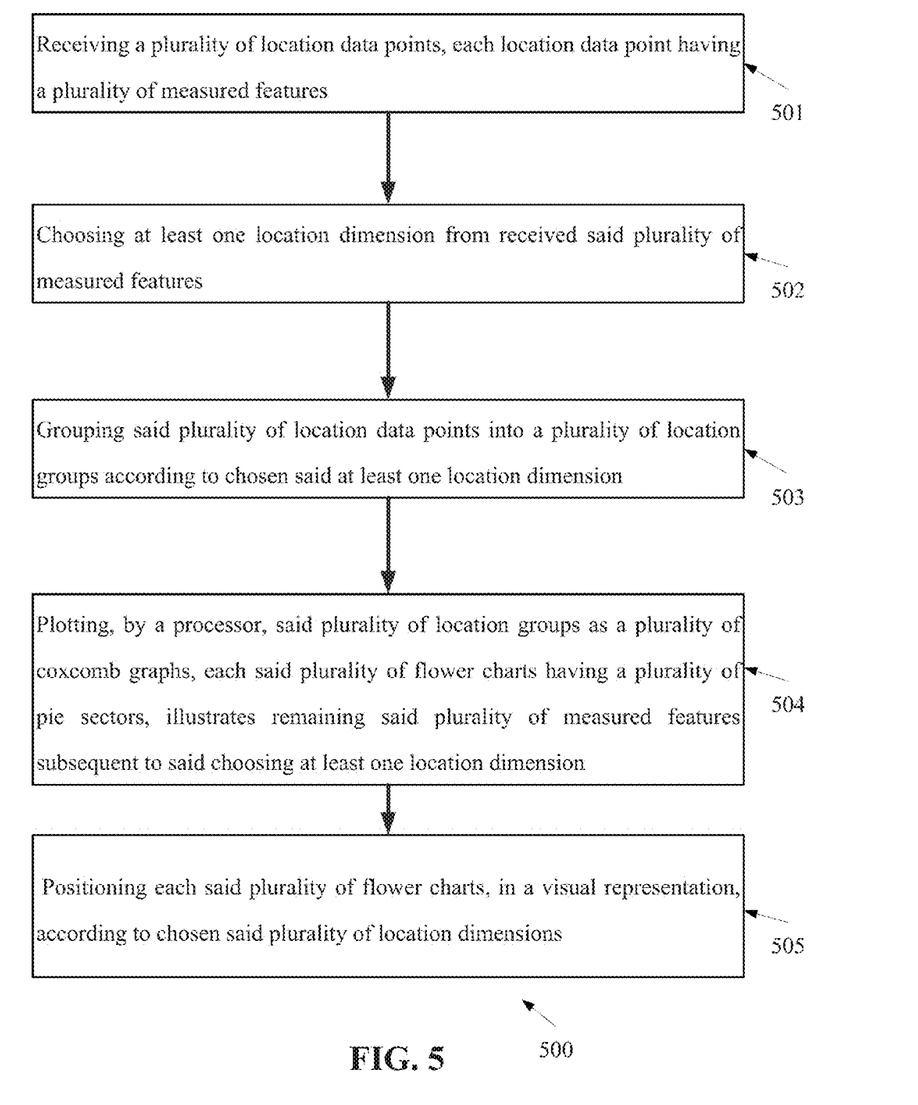
FIG. 5 is an illustration of a computerized visualization method for illustrating multi-dimensional data, according to some aspects of the present invention.

Reference is now made to FIG. 5 illustrating a computerized visualization method 500 for illustrating multi-dimensional data, according to some aspects of the present invention. First, a plurality of location data points is received 501. Each location data point has at plurality of measured features such as a location along an axis, a number of transductions, a number of vehicles, a slow down period etc. Then, at least one location dimension is chosen from received dimensions 502. The location dimensions may be two dimensional. The location dimensions may be three or more dimensional. The location dimensions may be as described in FIG. 2. Then, location data points are grouped into a location groups according to chosen location dimension(s) 503. Optionally, the data points are clustered prior to grouping. Then, location groups are plotted 504. Plotting occurs by a processor. Each flower chart has pie sectors. It illustrates the remaining dimensions (i.e. dimensions other than the chosen location dimensions). The flower charts may be as illustrated in FIGS. 3 and 4. Then, each flower chart is positioned according to chosen location dimensions 505. Optionally, the center of the flower chart indicates the associated location.

Figure 6:
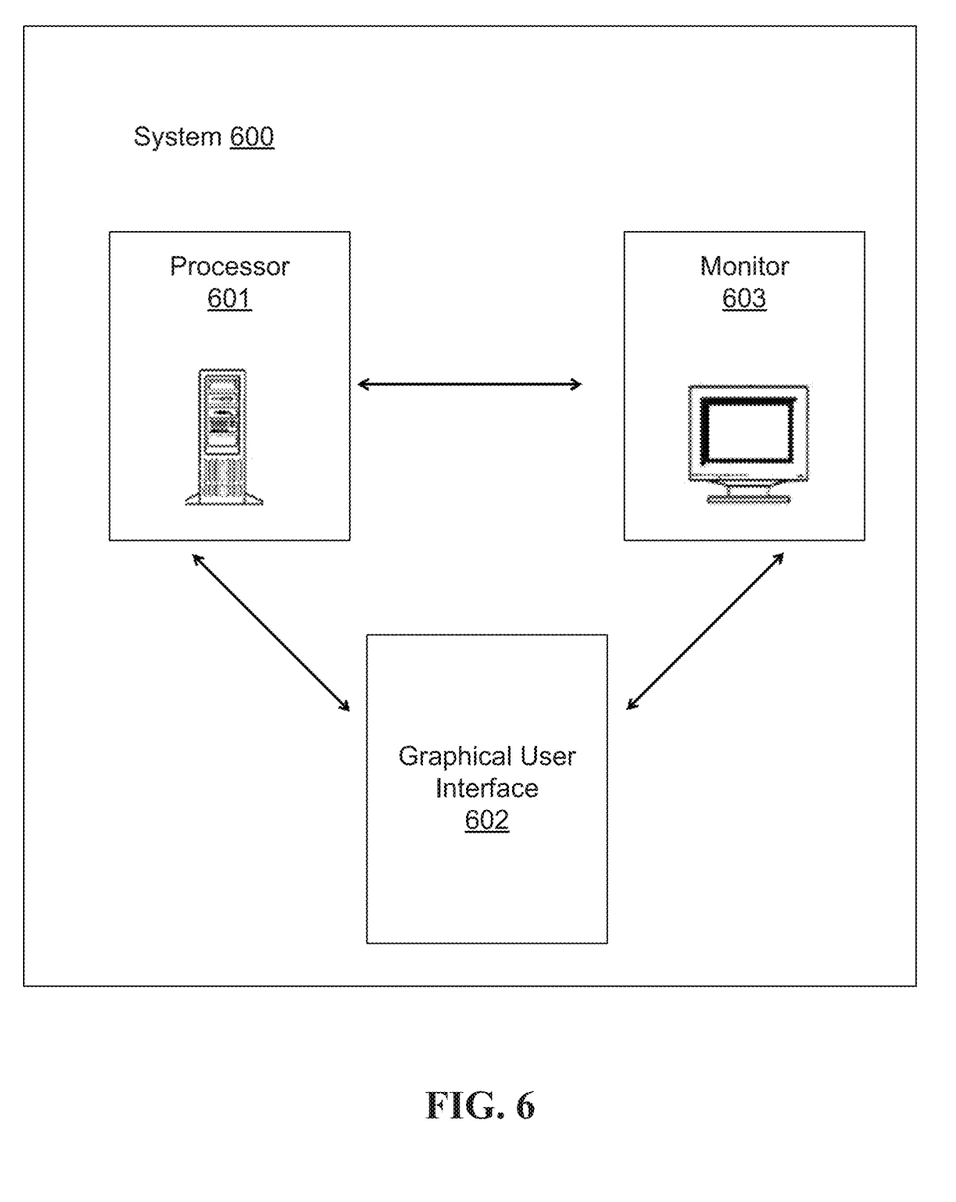
FIG. 6 is an illustration of a system for visualizing multi-dimensional data, according to some aspects of the present invention.

Reference is now made to FIG. 6 illustrating a system 600 for visualizing multi-dimensional data, according to some aspects of the present invention. The system 600 comprises a processor 601 and a graphical user interface 602. The graphical user interface 602 interfaces with the processor 601. The graphical user interface 602 receives multiple location data points. Location data points may be, for example, slow-down time and duration of a single transportation vehicle, slow-down time and duration of a person, slow-down time and duration of an item, amount of drawn cash from an Automated Teller Machine (ATM) and time of draw, provided service, amount of total buy, number of persons withdrawing a certain amount, hospital occupancy by room, location of the room, month of the year, duration patients hospitalization periods, number of occupied beds etc. Each location data point has at least five dimensions. The graphical user interface 602 may enable a user to choose a plurality of location dimensions from the received dimensions. Optionally, the desired location dimensions are predefined. For example: X and Y coordinates, Global Positioning System (GPS) location coordinates. The processor groups the location data points into location groups. The grouping is performed according to the chosen location dimensions. The processor also plots the location groups as flower charts. Each flower chart illustrates the remaining dimensions which were not chosen as the location dimensions. Optionally, the system 600 further comprises a monitor. The monitor interfaces with the processor, and the GUI interacts with a display on the monitor.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized visualization method for illustrating multi-dimensional data, comprising:
   receiving a plurality of location data points, each location data point having a plurality of measured features;
   choosing at least one location dimension from received said plurality of measured features;
   grouping said plurality of location data points into a plurality of location groups according to chosen said at least one location dimension;
   plotting, by a processor, said plurality of location groups as a plurality of flower charts, each said plurality of flower charts, having a plurality of pie sectors, illustrates remaining said plurality of measured features subsequent to said choosing at least one location dimension;
   positioning each said plurality of flower charts, in a visual representation, according to chosen said plurality of location dimensions;
   wherein each said plurality of pie sectors has at least one segment and any two pixels of same at least one segment have an identical color value; and
   wherein a plurality of segments of said plurality of pie sectors is organized according to opacity having a series of graduated tones ranging from black to white.

2. The method of claim 1, wherein a plurality of colors of a plurality of segments of said plurality of pie sectors is organized according to a color continuum scale.

3. The method of claim 1, wherein said at least one segment represents at least two dimensions by at least one of: a continuous color range, a single color, an opacity, a size of an area, a visual geometric pattern and a length of a segment.

4. A computerized visualization method for illustrating multi-dimensional data, comprising:
   receiving a plurality of location data points, each location data point having a plurality of measured features;
   choosing at least one location dimension from received said plurality of measured features;
   grouping said plurality of location data points into a plurality of location groups according to chosen said at least one location dimension;
   plotting, by a processor, said plurality of location groups as a plurality of flower charts, each said plurality of flower charts, having a plurality of pie sectors, illustrates remaining said plurality of measured features subsequent to said choosing at least one location dimension;
   positioning each said plurality of flower charts, in a visual representation, according to chosen said plurality of location dimensions; and
   wherein remaining said plurality of measured features illustrated by each said plurality of flower charts depict raw data of said plurality of location data points.

5. The method of claim 4, wherein said raw data is not aggregated and said raw data is not statistically manipulated.

6. The method of claim 4, further comprising:
   displaying said plurality of flower charts as a figure on an electronic display screen.

7. The method of claim 4 further comprising:
   receiving an additional plurality of location data points, each location data point having said plurality of measured features;

grouping said additional plurality of location data points into said plurality of location groups according to chosen said at least one location dimension; and re-plotting, by a processor, said plurality of location groups, which comprise said additional plurality of location data point, as a plurality of flower charts, each said plurality of flower charts illustrating remaining said plurality of measured features.

8. The method of claim 4 wherein said each location data point has exactly five dimensions.

9. The method of claim 8, said five dimensions include: a location along an X axis, a location along a Y axis, a temporal dimension and two additional dimensions.

10. The method of claim 4 wherein each said plurality of flower charts is plotted as at least one of: a star with a plurality of pie sectors radiating from an origin, a ring and a radial graph.

11. The method of claim 4 wherein said positioning each said plurality of flower charts is performed by placing a center of each said plurality of flower charts at a position dictated by chosen said plurality of location dimensions of a respective group of said plurality of location groups.

12. The method of claim 4 wherein said visual representation is at least one of a city map, a road map, a geographic map, a building layout, a model of a retail store interior.

13. A system for visualizing multi-dimensional data comprising:
- a processor;
- a graphical user interface interfaced with said processor;
wherein said graphical user interface:
- receives a plurality of location data points, each location data point having a plurality of measured features; and
- enables a user to choose at least one location dimension from received said plurality of measured features;

wherein said processor:
- groups said plurality of location data points into a plurality of location groups according to chosen said at least one location dimension;
- plots said plurality of location groups as a plurality of flower charts, each said plurality of flower charts, having a plurality of pie sectors, illustrates remaining said plurality of measured features subsequent to said choosing at least one location dimension; and
- positions each said plurality of flower charts, in a visual representation, according to chosen said plurality of location dimensions; and wherein a plurality of segments of said plurality of pie sectors is organized according to opacity having a series of graduated tones ranging from black to white.

14. The system of claim 13, wherein each said plurality of pie sectors has at least one segment and any two pixels of same at least one segment have an identical color value.

15. The system of claim 13, wherein a plurality of colors of a plurality of segments of said plurality of pie sectors is organized according to a color continuum scale.

16. The system of claim 13, wherein remaining said plurality of measured features illustrated by each said plurality of flower charts depict raw data of said plurality of location data points.

* * * * *